United States Patent [19]
Kaelin

[11] Patent Number: 4,465,645
[45] Date of Patent: Aug. 14, 1984

[54] ROTARY SURFACE AERATOR WITH ADJUSTABLE LIQUID TRANSPORTING UNITS

[76] Inventor: Joseph R. Kaelin, Beckenriedstrasse 58, CH-6374 Buochs, Switzerland

[21] Appl. No.: 407,928

[22] Filed: Aug. 13, 1982

[30] Foreign Application Priority Data

Aug. 14, 1981 [CH] Switzerland .................. 5244/81

[51] Int. Cl.³ .............................................. B01F 3/04
[52] U.S. Cl. ...................................... 261/87; 210/219; 210/221.2; 239/558; 239/562; 261/91; 261/93; 261/120; 261/123; 416/186 A
[58] Field of Search ............... 261/87, 91, 93, 120, 261/129, 123; 210/219, 220, 221.1, 221.2; 239/558, 562; 209/169, 170; 416/186 A

[56] References Cited

U.S. PATENT DOCUMENTS

| | | | |
|---|---|---|---|
| 1,846,875 | 2/1932 | Karr et al. | 261/129 X |
| 2,280,979 | 4/1942 | Rocke | 261/93 X |
| 2,733,853 | 2/1956 | Trumpler | 416/186 A X |
| 3,341,450 | 9/1967 | Ciabattari et al. | 261/91 X |
| 3,780,998 | 12/1973 | Botsch | 261/91 |
| 3,875,279 | 4/1975 | Kaelin | 261/91 |
| 3,969,446 | 7/1976 | Franklin, Jr. | 261/93 X |
| 4,021,349 | 5/1977 | Kaelin | 261/93 X |
| 4,161,371 | 7/1979 | Sheppa | 416/186 A X |

FOREIGN PATENT DOCUMENTS 506756 10/1954 Canada .......................... 416/186 A Primary Examiner—Richard L. Chiesa
Attorney, Agent, or Firm—Eric P. Schellin

[57] ABSTRACT

The rotary surface aeration device used to rotate and aerate sewage is provided with a carrying part connected to a vertically running drive axle. A plurality of liquid transporting units also fastened to the carrying part.

In order to improve the oxygen input, the liquid transporting units, which are adjacent to each other viewed in the circumferential direction of the rotary aerating device, have different jet exiting speeds. This is achieved by giving the scoop outlet edges of these liquid transporting units, which are adjacent to each other, a different distance (d, d') from the drive axle of the rotary aeration device. The liquid transporting units are arranged and constructed in such a way that the liquid jets of at least two liquid transporting units, which are adjacent viewed in the circumferential direction of the rotary aeration device, exiting from said units during the operation of the rotary aeration device strike each other before reentering into the liquid to be aerated.

5 Claims, 4 Drawing Figures

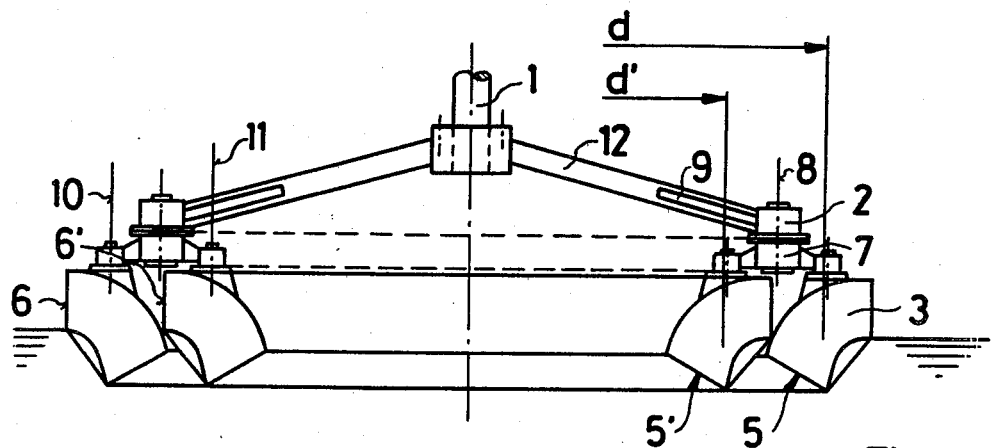
Fig. 1
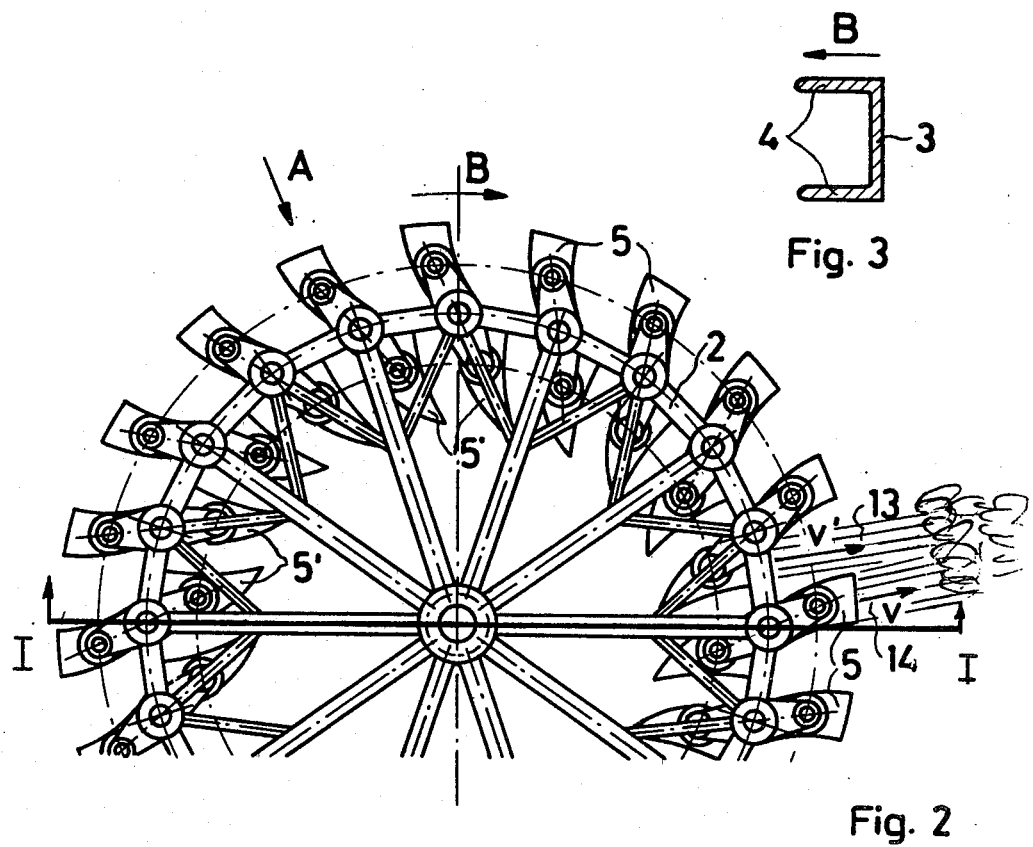
Fig. 3
Fig. 2

ROTARY SURFACE AERATOR WITH ADJUSTABLE LIQUID TRANSPORTING UNITS

BACKGROUND OF THE INVENTION

The invention concerns a rotary surface aeration device for rotating and aerating water, especially sewage in sewage-treatment plants. The device is provided with a carrying part connected to a vertically running drive axle, and the carrying part has a plurality of liquid transporting units fastened to it, each consisting of at least one scoop and an associated current guide wall. The inlet side of the liquid transporting units is below the water surface during operation and the outlet side of the units is at least primarily above the water surface during operation, as well as the use of this rotary surface aeration device.

The previously known rotary aeration devices have the disadvantages that differently constructed rotary aeration devices are required for different revolutions per minute and/or transport capacities, so that an efficient manufacture is not possible on account of the requirement of different parts for the rotary aeration devices. In in addition, their ability to add oxygen should also be improved.

SUMMARY

The present invention has the object of creating a rotary surface aeration device which is constructed from standardized parts, thereby permitting the manufacture of rotary aeration devices with very different operating characteristics, and also making possible a greater input of oxygen per kilowatt of driving the rotary aeration device.

The invention solves this task for a rotary surface aeration device of the type initially mentioned as follows: The scoop outlet edges of the liquid transporting units which are arranged adjacent to each other viewed in the circumferential direction of the rotary aeration device, have a different distance from the drive axle of the rotary aeration device.

It is possible in this way, in spite of the use of completely identical construction parts, to assemble rotary aeration devices with scoop outlet angles which differ from each other. That is, rotary aeration devices can be assembled which have different operating characteristics by appropriately assembling the individual liquid transporting units to the carrying part.

It is advantageous if the average distances of the liquid transporting units, which are located adjacent to each other viewed in the circumferential direction of the rotary aeration device, are different from each other in relation to the drive axle of the rotary aeration device.

In order to adapt the rotary aeration device to different revolutions per minute, it is advantageous if at least each two liquid transporting units can be adjusted preferably about one vertical axle, if they are located on a common pivot bracket, and if the pivot brackets are each connected adjustably about a vertical axle to the carrying part of the rotary aeration device. It is advantageous if adjustment means are provided for adjusting the pivot brackets in common, and if adjustment means are provided for adjusting the liquid transporting units in common relative to the pivot brackets which carry them.

In order to increase the oxygen input, it proved to be advantageous if the liquid transporting units are arranged in such a way that the liquid jets of at least two liquid transporting units, which are adjacent viewed in the circumferential direction of the rotary aeration device, exiting from said units during the operation of the rotary aeration unit strike each other before reentering into the liquid to be aerated.

The invention also has as an object the use of the rotary surface aeration device of the invention in an aeration basin, which use is characterized in that a current guide pipe extending to the bottom area of the basin is located under the rotary aeration device and coaxial to its axis of rotation. A distributing propeller driven in the opposite direction of the rotary aeration device as well as supply means for supplying oxygen or an oxygen mixture into the cross section of the current of the current guide pipe are coaxially located in the current guide pipe.

The invention is described below by way of example with reference made to the drawings.

BRIEF DESCRIPTION OF THE DRAWINGS

FIG. 1 shows a section along line I—I in FIG 2 through an embodiment of a rotary surface aeration device according to the invention.

FIG. 2 is a plan view of the rotary surface aeration device of FIG. 1.

FIG. 3 shows an example of a profile form of the outlet side of the liquid transporting units viewed in the direction of arrow A in FIG. 2.

DETAILED DESCRIPTION

Figure 4:
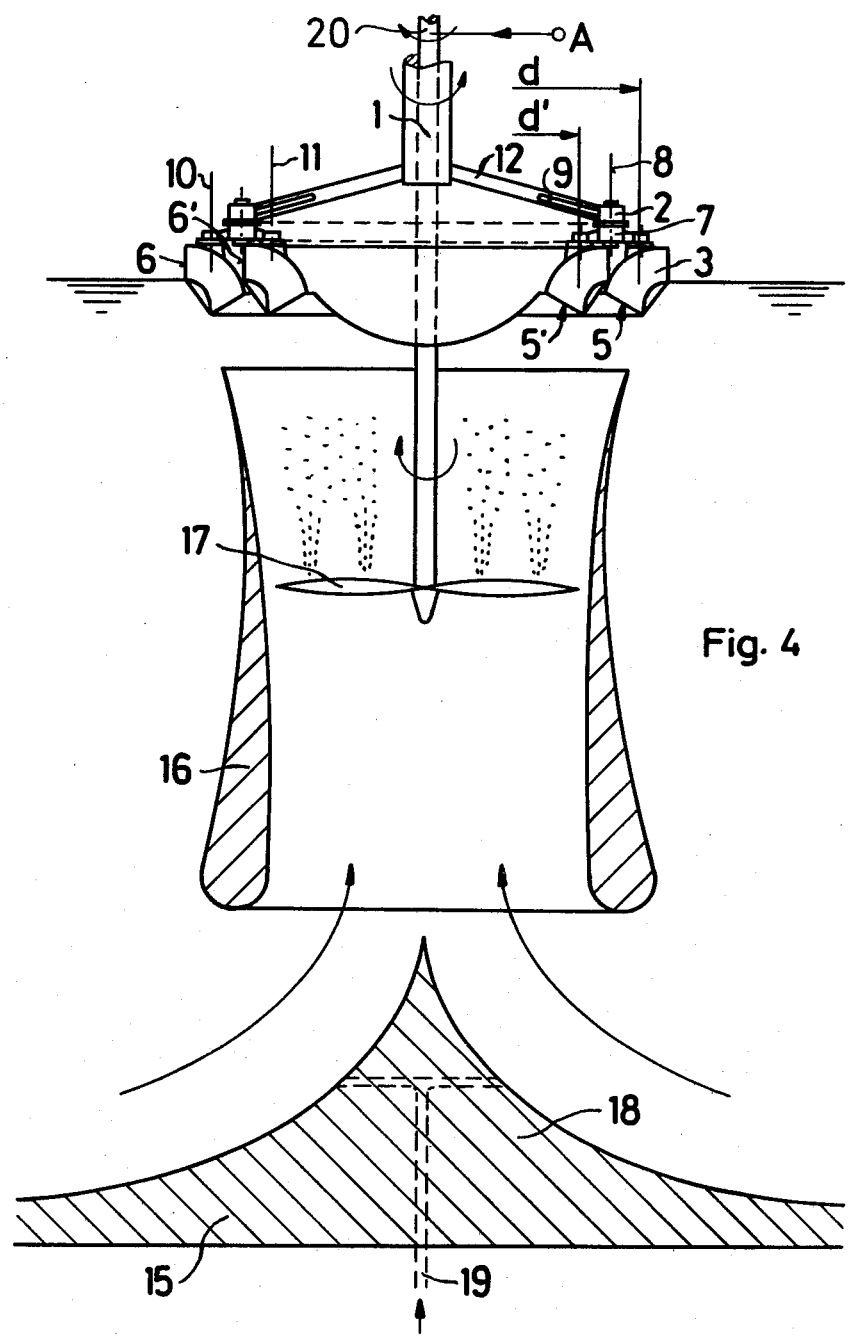
FIG. 4 shows the section analogous to FIG. 1 showing the arrangement of the rotary aeration device in a basin.

As can be seen from the drawings, the rotary surface aeration device shown has a carrying part 2 connected to a vertically running drive axle 1, which carrying part has a plurality of liquid transporting units 5 fastened to it, each consisting of a scoop and associated current guide wall 4.

In order to achieve different exiting speeds v respectively v′ of the liquid jets exiting from liquid transporting units 5 and 5′, which are adjacent to each other, scoop outlet edges 6 respectively 6′ of liquid transporting units 5 and 5′, which are located adjacent to each other viewed in the circumferential direction of the rotary aeration device, have a different distance d and d′ respectively, from the drive axle of the rotary aeration device.

In order to make possible a very flexible setting of the individual liquid transporting devices 5, 5′ in relation to each other, each of the two liquid transporting units 5 and 5′ are adjustable about a vertical axle 10 and 11 respectively, located on a common pivot bracket 7. The pivot brackets are each connected adjustably about a vertical axle 8 to the carrying part 2 of the rotary aeration device.

Hydraulic lines 9 are located in carrying arms 12 of carrying part 2. These hydraulic lines permit a common hydraulic adjustment of pivot brackets 7 as well as a common hydraulic adjustment of the individual liquid transporting devices 5 and 5′ relative to pivot brackets 7 which carry them, so that when the revolutions per minute of the rotary surface aerating device are changed, the setting of liquid transporting units 5 and 5′ can be adapted correspondingly.

In order to achieve as great an oxygen input as possible per kilowatt of drive of the rotary aeration device, liquid transporting units 5 and 5' are arranged and constructed in such a way that liquid jets 13, 14 which exit during the operation of the rotary aeration device from liquid transportation devices 5 and 6', which are adjacent and staggered in relation to each other viewed in the circumferential direction of the rotary aeration device and which have a different jet exiting speed v and v', strike each other and split up each other before their reentry into the liquid to be aerated, so that even the liquid present in the interior of liquid jets 13 and 14 is exposed to the oxygen present in the ambient air and is thus aerated.

As can be seen from FIG. 4, when the rotary surface aeration device is placed in a basin 15, a current guide pipe 16 can be placed under the rotary surface aeration device in order to create a circulating current which sweeps the entire height of the basin. This current guide pipe runs from directly below the intake side of the rotary aeration device to the bottom area of basin 15.

A rapid-running distributing propeller 17 is provided below current guide pipe 16 to intensify the oxygen input. This propeller rotates counter to the direction of rotation of the rotary aeration device and has the function of distributing oxygen or a gas containing oxygen, e.g. air, added into the basin liquid.

The additional oxygen can be added for example, via a supply line 19 running in current cone 18, as is indicated in dotted lines, or, it is also possible to provide air escape openings in subpressure areas of distributing propeller 17, as is also shown in FIG. 4, which holes communicate over supply lines in the propeller blades with the inside of hollow drive shaft 20, so that air is sucked in automatically via this shaft from the ambient atmosphere A and is added into the basin liquid by distributing propeller 17. In this arrangement the rotary surface aeration device is driven at 50 revolutions per minute, for example, and distributing propeller 17 is driven in the opposite direction at approximately 280 revolutions per minute.

I claim:

1. A rotary surface aeration device for rotating and aerating sewage in a sewage treatment plant, having a carrying part connected to a vertically running drive axle, the carrying part has a plurality of pairs of liquid transporting units fastened to the part, each liquid transporting unit has at least one scoop and associated current guide wall, the inlet side of the liquid transporting units is below the surface of the sewage during operation and the outlet side of the units is at least primarily above the sewage surface during operation, said device is further characterized wherein each scoop is provided with scoop outlet edges, the outlet edges of the scoops of a pair of liquid transporting units, and the liquid transporting units themselves are arranged adjacent each other viewed in the circumferential direction and spaced different distances from the drive axle of said device, each pair of liquid transporting units is arranged about a rotatable vertical axle of the carrying part, the pair of units is located on a common pivot bracket having separate pivot brackets for each unit, whereby each unit can be adjusted with respect to the adjacent unit in the pair about the vertical axle of the carrying part of said device.

2. Rotary aerating device according to claim 1 wherein adjustment means are provided for adjusting the separate pivot brackets in common.

3. Rotary aeration device according to claim 2 wherein the adjustment means is provided for adjusting the liquid transporting units in common relative to the separate pivot brackets which carry them.

4. Rotary aeration device according to either claim 1, 2 or 3, characterized in that the liquid transporting units are arranged in such a way that the liquid jets of a pair of adjacent liquid transporting units exiting from said units during the operation of the rotary aeration unit strike each other before reentering into the liquid to be aerated.

5. Rotary surface aeration device according to claim 1 disposed in an aeration basin, wherein a current guide pipe extending to the bottom area of the basin is located under the rotary aeration device and coaxial to its axis of rotation, the current guide pipe is provided with a distributing propeller driven in the opposite direction of the rotary aeration device, as well as supply means for supplying oxygen or an oxygen mixture into the cross section of the current in the current guide pipe.

* * * * *